G. E. DAVIS.

WRITING TABLET.

APPLICATION FILED JULY 17, 1917.

Reissued June 25, 1918. 14,488.

INVENTOR

George E. Davis,

By Attorneys,

Fraser, Turk & Myers

WITNESSES:

René Spreine

Ethel C. Nelson

UNITED STATES PATENT OFFICE.

GEORGE E. DAVIS, OF VISTA, CALIFORNIA.

WRITING-TABLET.

14,488. Specification of Reissued Letters Patent. Reissued June 25, 1918.

Original No. 1,211,297, dated January 2, 1917, Serial No. 71,763, filed January 12, 1916. Application for reissue filed July 17, 1917. Serial No. 181,143.

*To all whom it may concern:*

Be it known that I, GEORGE E. DAVIS, a citizen of the United States of America, residing at Vista, in the county of San Diego and State of California, have invented new and useful Improvements in Writing-Tablets, of which the following is a specification.

This invention relates to improvements in writing tablets or pads, and more particularly to a guide sheet therefor.

The object of the invention is the provision of a guide sheet of the above stated character having guide provisions adapted to be visible through one of the tablet leaves and of a width greater than the width of the tablet, whereby the protruding longitudinal edges of the guide sheet may be angularly bent, thus preventing any accidental creeping movement of the guide sheet from between the tablet leaves.

With the above and other objects in view, the invention consists in the novel features, details of construction and combination of parts which will hereinafter be more fully set forth, illustrated in the accompanying drawing and pointed out in the appended claims.

In the accompanying drawings,—

Figure 1:
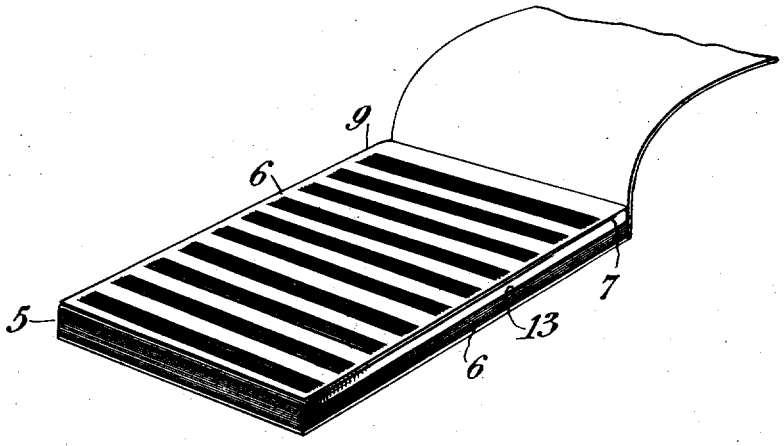
Figure 2:
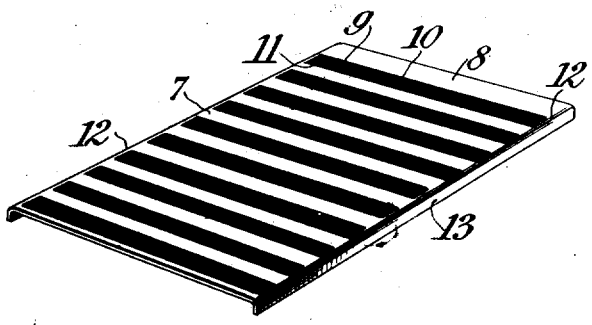

Figure 1 is a perspective view of a writing tablet shown in an open position with my improved guide sheet illustrated as inserted therein; and Fig. 2 is a perspective view of the guide sheet removed from the tablet.

Referring more specifically to the drawing by way of reference characters, wherein like reference characters refer to corresponding parts in the several views, 5 denotes the writing tablet provided with a series of leaves 6. It is my object to use in connection with the writing tablet an improved form of guide sheet designated by the reference character 7 which is preferably constructed of paper or the like material, of a quality slightly stouter than the tablet leaves. Upon the outer face 8 of the guide sheet 7 is ruled a series of spaced parallel broad dark lines which extend for the full width of the guide sheet and are clearly visible through the sheet upon which the written matter is inserted.

These guide lines in effect produce through the letter sheet a series of fields or zones in the nature of bands, and are to be distinguished from the usual guide lines by the fact that the writing is written across or upon the surface of the zones. The alternate spaces are also preferably used, in which case the top edges of the zones act as the guide for the writing in the lighter spaces. Preferably the bands or zones are all equal in breadth, and of substantially the same width as the spaces between them.

It is to be stated when the guide sheet 7 is in the position as shown in Fig. 1, the writer in accurately following the guide lines 9, follows the uppermost line 10 until he has completed the writing of one full line. The writer then begins the next line by following the lowermost straight edge or surface 11 of the guide lines 9 and the visible dark guide line will greatly assist and better enable him to detect the writing surface of the paper upon which he is inserting the scrip or written matter. This identical operation is followed throughout the full area of the paper and therefore a further description of the nature and advantage of these guide lines is thought not to be necessary.

The guide sheet at points adjacent its opposite longitudinal edges 12 is crimped or bent downwardly to provide flanges 13, whereby the guide sheet may be readily and accurately inserted between the sheets of the tablet and after the guide sheet has assumed its active position, the flanges 13 further prevent any accidental lateral creeping movement of the guide sheet from between the sheets of the tablet when the writer is in the act of writing upon the sheets of the tablet.

From the foregoing description, taken in connection with the accompanying drawing, the advantages of construction and of the method of operation will be readily apparent to those skilled in the art to which the invention relates, and while I have described the principles of operation of the device together with the device which I now consider to be the best embodiment thereof, I desire to have it understood the device shown is merely illustrative and such changes may be made when desired as are within the scope of the claims appended thereto.

What I claim is:—

1. A writing tablet having a plurality of sheets of paper and having a guide sheet of a greater width, said guide sheet having guiding provisions adapted to be visible through one of said sheets of paper, the edges of the guide sheet protruding beyond the tablet sheets being bent angularly to prevent any accidental lateral creeping movement of the guide sheet from between the tablet sheets.

2. A writing tablet having a plurality of sheets of paper and having a guide sheet of a greater width, said guide sheet having guiding provisions adapted to be visible through one of said sheets of paper, the edges of the guide sheet protruding beyond the tablet sheets being bent angularly to prevent any accidental lateral creeping movement of the guide sheet from between the tablet sheets, the said angularly bent portions of the guide sheet further serving as guide flanges for accurately positioning the guide sheet between the sheets of the tablet.

3. A guide sheet for writing tablets having a series of broad, dark, equally-spaced bands thereon, said bands being visible through one of the sheets of paper when in position for use, and the bands being substantially as broad as the spaces between them.

4. A writing tablet having a plurality of sheets of paper and having a guide sheet, said guide sheet having a series of broad, dark equally-spaced lines thereon, said lines being visible through one of said sheets of paper when in position for use, and the lines being substantially as broad as the spaces between them.

5. A guide sheet for writing paper having a series of broad dark bands thereon and a series of alternately arranged broad light bands, the dark bands being visible through a superposed sheet of paper when in position for use, and both said dark and light bands being of sufficient breadth to permit a superposed sheet to receive writing within the spaces immediately above either the dark or light bands.

In witness whereof, I have hereunto signed my name in the presence of two subscribing witnesses.

GEORGE E. DAVIS.

Witnesses:
JOHN BOYLE,
JEMMIE G. HAYES.

Copies of this patent may be obtained for five cents each, by addressing the "Commissioner of Patents, Washington, D. C."